United States Patent Office 3,274,159
Patented Sept. 20, 1966

3,274,159
POLYESTER IMIDES OF TRIMELLITIC ANHYDRIDE
Rudolph W. Kluiber, Bernardsville, N.J., assignor to Union Carbide Corporation, a corporation of New York
No Drawing. Filed Jan. 7, 1963, Ser. No. 249,611
4 Claims. (Cl. 260—75)

The invention relates to polyester imides of trimellitic anhydride and to method for preparation thereof.

Polyester imides of the present invention have the general formula

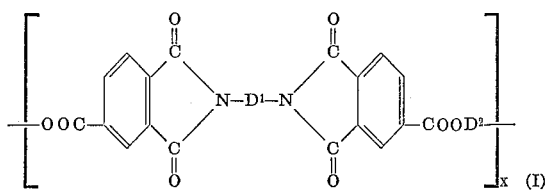

wherein $D^1$ and $D^2$ are individually selected from
(A) Divalent hydrocarbon radicals wherein the bonding carbon atoms are saturated and have at least one hydrogen atom attached thereto, and
(B) Divalent hydrocarbon-ether radicals containing as many as 5 internal ether oxygen atoms wherein each ether oxygen atom is attached to saturated carbon atoms each of which has at least one hydrogen atom attached thereto and wherein each oxygen atom is separated from another oxygen atom by at least two carbon atoms; and $x$ is an integer such that the polyester imide has a reduced viscosity, measured at 50° C. as a 0.2 gram sample in 100 milliliters of p-chlorophenol, of from about 0.4 to about 20.

One of $D^1$ and $D^2$ in Formula I above can be selected from (A) or (B). Or, both $D^1$ and $D^2$ can be selected from either (A) or (B); in this event $D^1$ and $D^2$ can be the same or different radicals of the group (A) or (B).

$D^1$ and/or $D^2$, selected from the hydrocarbon radical group (A), can be, for example, alkylene groups having the general formula —$C_nH_{2n}$— such as methylene, ethylene, trimethylene, propylene, butylene, amylene, hexamethylene, heptamethylene, octamethylene, nonamethylene, decamethylene, undecamethylene, dodecamethylene, tridecylene, tetradecylene, pentadecylene, hexadecylene, heptadecylene, octadecylene, nonadecylene, eicosylene, and isomeric forms and higher homologs thereof;

divalent alicyclic groups such as 1,2-, 1,3-, and 1,4-cyclohexylene, 1,2- and 1,3-cyclopentylene, and 1,2- and 1,3-cyclobutylene;

and divalent aralkylene groups such as ortho, meta, and para xylylene:

And, $D^1$ and/or $D^2$, selected from hydrocarbon-ether radical group (B), can be, for example, the above listed hydrocarbon radicals containing as many as five internal ether oxygen atoms wherein each oxygen atom is attached to saturated carbon atoms each of which has at least one hydrogen atom attached thereto and wherein each oxygen atom is separated from another ether oxygen atom by at least two carbon atoms.

Certain polyester imides have been prepared heretofore by the reaction of acid anhydrides and aminoalcohols. Aminoalcohol-based polyester imides, however, are limited in variety by the relatively few aminoalcohols available and are limited in utility by characteristically low melting points and poor strength properties.

It has now been discovered that theromplastic polyester imides containing aromatic nuclei and having high use temperature characteristics can be prepared in wide variety by causing to react aliphatic glycols and bis-trimellitimidates at an elevated temperature, preferably in the presence of a catalytic amount of a transesterification catalyst.

The reaction to the polyester imides proceeds according to the following scheme wherein $D^1$ in Formula II and $D^2$ in Formula III have the significance given in Formula I above.

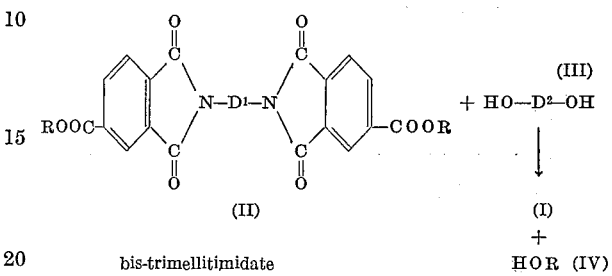

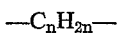
bis-trimellitimidate                    HOR (IV)

The radical R in Formulas II and IV can be a saturated aliphatic group, i.e., alkyl or cycloalkyl, containing from 1 to 6 carbon atoms inclusive, such as, for example, methyl, ethyl, propyl, butyl, pentyl, hexyl, and isomeric forms thereof, and cyclohexyl. It is desirable that the alcohol by-product, HOR (IV), be the most volatile component in the system so as to allow efficient removal from the polymerization system. Preferred is a bis-trimellitimidate (II) wherein R is methyl; in this case methyl alcohol will be the alcohol by-product.

The bis-trimellitimidates (II) are prepared, in general, by causing to react trimellitic anhydride, which has the structural formula:

$$\text{HOOC}\begin{array}{c}\text{(V structure)}\end{array}$$ (V)

and a diprimary diamine having the structural formula:

$$H_2N-D^1-NH_2 \quad (VI)$$

at a temperature above about 25° C. to form a bis-trimellitimide, and esterifying the bis-trimellitimide, or preferably the corresponding bis-trimellitimidoyl chloride, with a primary alcohol having the structural formula HOR (IV), wherein $D^1$ has the significance given in Formula I above.

The amount of the glycol reactant (III) used is usually in excess of stoichiometric proportions when no solvent is employed in the polymerization reaction. Generally about a 10 percent by weight excess of glycol is desirable for efficient reaction, although excesses of up to 100 percent by weight over the stoichiometric proportions can be used with suitable rates of reaction and with resultant production of high molecular weight polymers.

Preferred as the glycol reactant (III) is an alpha, omega-glycol or an alpha,omega-(glycol-ether) having the formula $$HOCH_2-Y^2-CH_2OH \quad (VII)$$

wherein $D^2$ of Formula III above is equal to

—$CH_2$—$Y^2$—$CH_2$— wherein $Y^2$ is selected from
(a) divalent radical of the formula —$(CH_2)_n$—, wherein $n$ is an integer from 0 to 8 inclusive;
(b) divalent ether radical of the formula —$(CH_2)_n$—O—$(CH_2)_n$— where n is an integer from 1 to 3 inclusive; and
(c) divalent ether radical of the formula

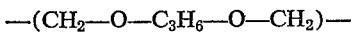
—(CH$_2$—O—C$_3$H$_6$—O—CH$_2$)—

Particularly desirable specific alpha,omega-glycols are 1,2-ethylene glycol, 1,3-trimethylene glycol, 1,4-tetramethylene glycol, 1,5-pentamethylene glycol, 1,6-hexamethylene glycol, 3-methylpentane 1,5-diol, and 1,10-decamethylene glycol.

Particularly desirable specific alpha,omega-(glycol-ethers) are bis-(2-hydroxyethyl)ether, bis-(4-hydroxybutyl)ether, and the bis(2-hydroxyethyl)ether of propylene glycol.

When these alpha,omega-glycols and alpha,omega-(glycol-ethers) are employed the exchange reaction proceeds most readily and with fewer side reactions, thus reducing the time required for completion of polymerization and increasing the molecular weight of the final product.

The bis-trimellitimidate reactant (II) is preferably a compound having the formula:

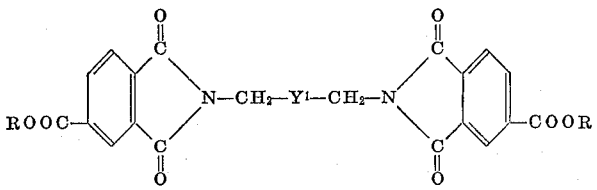

(VIII)

wherein D$^1$ of Formula VI above is equal to

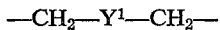
—CH$_2$—Y$^1$—CH$_2$— and wherein Y$^1$ has the significance given for Y$^2$ in Formula VII above, and R has the significance given in Formula II above.

Particularly desirable specific bis-trimellitimidates are dimethyl N,N'-hexamethylene-bis-trimellitimidate, wherein Y$^1$ contains 4 carbon atoms and R is methyl; dimethyl N,N'-ethylene-bis-trimellitimidate wherein Y$^1$ is representative of a bond between adjacent carbon atoms and R is methyl; dihexyl N,N'-hexamethylene-bis-trimellitimidate wherein Y$^1$ contains 4 carbon atoms and R contains 6 carbon atoms; and dimethyl N,N'-[bis-(3-propyl ether)] bis-trimellitimidate wherein Y$^1$ contains 4 carbon atoms and one ether oxygen atom and R is methyl; and dimethyl N,N'-propylene-bis-trimellitimidate wherein Y$^1$ contains 1 carbon atom and R is methyl.

The preferred polyester imide, therefore, has the general formula:

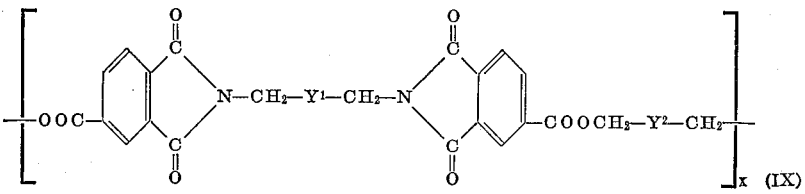

wherein Y$^1$ and Y$^2$ have the significance given in Formula VIII above and x has the significance given in Formula I above, it being noted that Y$^1$ and Y$^2$ can be members of the same group, i.e., a hydrocarbon radical group or hydrocarbon-ether radical group, or of different groups, and whether from the same or different groups Y$^1$ and Y$^2$ can be the same or different radicals.

To effect reaction of the glycol and bis-trimellitimidate a mixture thereof is heated. Usually a temperature of at least 175° C. is necessary to obtain polymerization to a normally solid polymeric product even where both the reactants melt below 175° C. Of course, systems starting with higher melting reactants require higher melt reaction temperatures. It is preferred, therefore, when carrying out the polymerization reaction in a melt to employ a temperature of about 175° C. or the melting point of the highest melting reactant or product as the minimum reaction temperature. It has been found, however, that heating of the reactants above about 260° C. causes some decomposition of the polyester imide.

The reaction can also be conducted in the presence of a solvent. When a solvent medium is used, the solvent should be in an inert organic liquid having a boiling point of above about 175° C. at atmospheric pressure. Useful solvents are, for example, α-chloronaphthalene, o-dichlorobenzene and the like. When a solvent is used it is similarly preferred that temperatures above 260° C. not be employed so as to avoid decomposition of the polymer.

With the use of a solvent, stoichiometric amounts of glycol and bis-trimellitimide are preferably used in order to produce polymers having highest molecular weights.

Reaction is carried out for a period varying with the reaction vessel, degree of agitation, quantities of reactants and proportions of reactants used and is in part determined by the desired end use properties of the polymer. Longer reaction times at a given reaction temperature for example, produce higher molecular weight polymers. Ordinarily reaction to a polyester imide of the desired molecular weight (reduced viscosity of about 0.4 to about 20, measured as described above) takes place within 0.5 to 2 hours but longer or shorter times are equally feasible.

Atmospheric pressures are most conveniently employed and since sub-atmospheric or super-atmospheric pressures do not appear to have any effect on reaction rate or polymer product obtained use of atmospheric pressure is preferred.

During polymerization and after the initial transesterification reaction, e.g. about 30 minutes after the start of reaction, a vacuum is applied to the system to remove from the reaction mass the excess glycol and alcohol by-product. Reaction is continued in this manner until a polyester imide of the desired molecular weight is obtained. Convenient periodic determinations of melt viscosity or reduced viscosity can be used to follow progress of the reaction. The polymeric product is then cooled and used directly from the reaction mixture without purification or other work-up.

As discussed above, the polymerization reaction can be conducted without use of a catalyst. However, transesterification proceeds much more rapidly in the presence of a catlyst and polymers of higher molecular weight are obtained. It is preferred, therefore that the reaction mixture contain a catalytic amount i.e., up to about 0.5 part of weight, of a conventional transesterification catalyst. Useful catalysts in the invention are the oxides and hydroxides of metals of Groups IA, IIA, IIIA, IVA, VA, VIB, VIIB, AND VIIIB of the Deming Periodic Table as published in the Handbook of Chemistry and Physics, 30th edition, page 312. Metal oxides and hydroxides deserving of special mention as catalysts herein are lithium oxide, lithium hydroxide, sodium oxide, sodium hydroxide, potassium oxide, potassium hydroxide, magnesium oxide, magnesium hydroxide, calcium oxide, calcium hydroxide, barium oxide, barium hydroxide ferric hydroxide, ferric oxide, cobalt oxide, cobalt hydroxide, zinc oxide, zinc hydroxide, cadmium oxide, cadmium hydroxide, and the like. Other useful trans-esterification catalysts are the monobasic and dibasic acid salts of the aforementioned metals, especially the lower aliphatic monobasic acid salts of these metals, e.g. those having up to 4 carbon atoms inclusive such as the acetate, propionate and butyrate salts of lithium, sodium, potassium, magnesium, calcium, iron, cobalt, nickel, cadmium, mercury, aluminum, germanium, tin and lead and the lower aliphatic dibasic acid salts of metals in the above enumerated groups, e.g., those having up to 10 carbon atoms inclusive, such as the oxalates, malonates, succinates, glutarates, adipates, pimelates, suberates, azelates and sebacates of lithium, sodium, potassium, magnesium, calcium, iron, cobalt, nickel, cadmium, mercury, aluminum, germanium, tin and lead. Still other trans-esterification catalysts especially deserving of mention are the ortho esters of titanium such as tetrabutyl titanate and trialkyl titanium halides such as triisopropyl titanium chloride, and p-toluene sulfonic acid.

The following examples illustrate the invention, but should not be construed as being limitative thereof. All parts and percentages are by weight unless otherwise mentioned.

EXAMPLE I

A. Preparation of the bis-trimellitimidate

Ninety six grams of trimellitic anhydride (0.5 mole) was dissolved in 500 milliliters of methanol. Twenty nine grams of hexamethylene diamine (0.25 mole) was stirred into the solution. The solution was heated at reflux with stirring for one hour. The methanol was removed by distillation under vacuum. The residue was recrystallized from dimethylformamide. The yield of the diimide diacid, N,N'-hexamethylene-bis-trimellitimide, was 108 grams. Forty seven grams of the diimide diacid was stirred into 150 milliliters of toluene and 98 milliliters of thionyl chloride was added. The mixture was heated at reflux with stirring for three hours. The thionyl chloride which had not reacted with the N,N'-hexamethylene-bis-trimellitimide to form the corresponding diacid chloride was removed by distillation. After excess thionyl chloride was removed, 100 milliliters of a 50 percent by volume methanol-toluene mixture was added to the reaction flask. The addition caused the precipitation of dimethyl N,N'-hexamethylene-bis-trimellitimidate. There was obtained, after drying and recrystallizing the precipitate from toluene, 30.6 grams of product having a melting point of 165–167° C.

The structure of this bis-trimellitimidate was

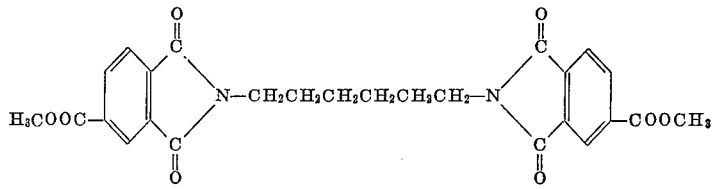

B. Preparation of polyester imide of trimellitic anhydride

Five parts of the bis-trimellitimidate prepared in A and 2 parts of 1,4-tetramethylene glycol were heated to 200° C. at atmospheric pressure until they melted. One drop (0.5 part) of tetrabutyl titanate was added. After fifteen minutes of heating at 200° C. and at atmospheric pressure to being about ester exchange the pressure was reduced to 0.3 mm. Hg. Heating at 200° C. was continued for an hour after which time the temperature was raised to 250° C. to melt the crystalline polymer. Heating was continued under vacuum for an additional half hour. The polymer was then removed mechanically from the reaction vessel.

The polymer had the repeating unit

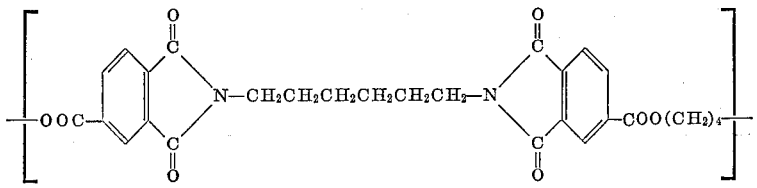

and a reduced viscosity of 0.88 measured at 61.4° C. as a 0.2 gram sample in 100 milliliters of p-chlorophenol. This polymer was readily drawn into tough crystalline fibers having a melting point of 240° C.

EXAMPLE 2

Five parts of dimethyl N,N'-hexamethylene-bis-trimellitimidate, 2 parts of diethylene glycol, and .05 part of tetrabutyl titanate were heated at 200° C. and atmospheric pressure for 30 minutes. The pressure was then reduced to 0.3 mm. Hg and polymerization continued for 18 hours. The polymer was separated as in Example 1.

The polymer had the repeating unit

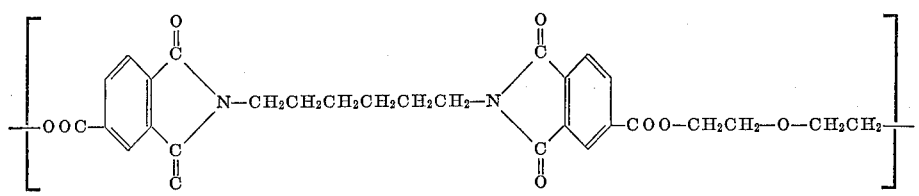

and a reduced viscosity of 0.55 measured at 53° C. as a 0.2 gram sample in 100 milliliters of p-chlorophenol. This polymer was readily drawn into tough, non-crystalline fibers.

EXAMPLE 3

Five parts of dimethyl N,N'-α,α-diaminodipropylether bis-trimellitimidate and 2 parts of hexamethylene glycol were heated to 200° C. and .05 part tetrabutyl titanate was added. Heating at 200° C. and atmospheric pressure was continued for 30 minutes, then the pressure was reduced to about 0.3 mm. Hg to aid in removal of the alcohol by-product and excess glycol. Heating at 200° C.

was continued for 4 hours. The polymer was separated as in Example 1.

The polymer had the repeating unit

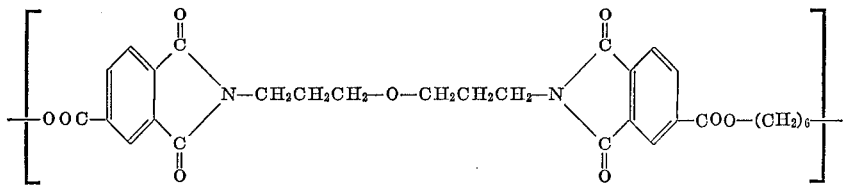

and a reduced viscosity of 0.62 measured at 61° C. as a 0.2 gram sample in 100 milliliters of p-chlorophenol.

This polymer was tough and flexible, and had a tensile modulus of 225,000 and a glass transition temperature ($T_g$) of 61° C.

EXAMPLES 4–10

A variety of polymers were prepared by the procedure of Example 1. Their properties were determined. Table I records the data collected for these examples.

TABLE I

| Polymers of example | $Y^1$(a) | $Y^2$(a) | $T_g$, °C. | Tensile Modulus at 25° C., p.s.i. | Yield Strength at 25° C., p.s.i. |
|---|---|---|---|---|---|
| 4 | Bond | —(CH₂)₃— | 115 | 320,000 | 8,400 |
| 5 | Bond | —(CH₂)₄— | 110 | | |
| 6 | —(CH₂)₄— | Bond | 98 | 340,000 | 7,700 |
| 7 | —(CH₂)₄— | —(CH₂)₂— | 80 | 305,000 | 6,800 |
| 8 | —(CH₂)₄— | —(CH₂)₃— | 73 | 283,000 | 7,000 |
| 9 | —(CH₂)₄— | —(CH₂)₄— | 67 | 262,000 | 7,500 |
| 10 | —(CH₂)₄— | —(CH₂)₈— | 45 | 211,000 | 4,100 | a Units refer to Formula IX.

Glass transition temperature, tensile modulus, and yield strength were determined on an Instron testing machine.

The polyester imides of this invention can be injection and compression molded onto numerous articles useful where toughness is a prime requisite. They can also be extruded into films and fibers of great toughness. These polyester imides have good high temperature use properties and good weathering characteristics which make them useful, for example, as outdoor wire insulation material.

EXAMPLE 11

Examples 1–10 are duplicated but employing no catalyst. A normally solid polymer is obtained in each case.

What is claimed is:

1. Polyester imide having the general formula:

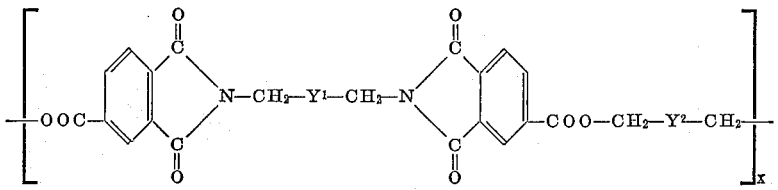

wherein $Y^1$ and $Y^2$ are individually selected from the group consisting of
 (a) divalent radical of the formula —(CH₂)ₙ—, wherein $n$ is an integer from 0 to 8, inclusive;
 (b) divalent ether radical of the formula
  —(CH₂)ₙ—O—(CH₂)ₙ—
 where $n$ is an integer from 1 to 3 inclusive;
 (c) divalent ether radical of the formula
  —(CH₂—O—C₃H₆—O—CH₂)—;
and $x$ is an integer such that the polyester imide has a reduced viscosity, measured at 50° C. as a 0.2 gram sample in 100 milliliters of p-chlorophenol, of from 0.4 to about 20.

2. Polyester imide claimed in claim 1 wherein $Y^1$ is —(CH₂)₄— and $Y^2$ is —(CH₂)₄—.

3. Polyester imide claimed in claim 1 wherein $Y^1$ is —(CH₂CH₂—O—CH₂CH₂)— and $Y_2$ is —(CH₂)—.

4. Polyester imide claimed in claim 1 wherein $Y^1$ is —(CH₂)₄ and $Y^2$ is —(CH₂—O—CH₂)—.

References Cited by the Examiner

UNITED STATES PATENTS

| | | | |
|---|---|---|---|
| 2,048,778 | 7/1936 | Brubaker et al. | 260—75 |
| 2,954,364 | 9/1960 | Coleman et al. | 260—75 |
| 3,182,073 | 5/1965 | Loncrini | 260—75 |

FOREIGN PATENTS 570,858  7/1945  Great Britain.

SAMUEL H. BLECH, *Primary Examiner.*

LOUISE P. QUAST, *Examiner.*